(12) United States Patent
Balaschak

(10) Patent No.: US 7,682,547 B2
(45) Date of Patent: Mar. 23, 2010

(54) INTEGRALLY FORMED MOLDED PARTS AND METHOD FOR MAKING THE SAME

(75) Inventor: Edward James Balaschak, Avon, OH (US)

(73) Assignee: General Electric Company, Schenectady, NY (US)

( * ) Notice: Subject to any disclaimer, the term of this patent is extended or adjusted under 35 U.S.C. 154(b) by 1544 days.

(21) Appl. No.: 10/973,577

(22) Filed: Oct. 26, 2004

(65) Prior Publication Data

US 2006/0087054 A1    Apr. 27, 2006

(51) Int. Cl.
*C03B 20/00* (2006.01)
*C03B 19/06* (2006.01)
*B28B 7/34* (2006.01)

(52) U.S. Cl. .............. 264/317; 264/635; 264/636; 264/910; 445/26

(58) Field of Classification Search .......... 264/275, 264/279, 910, 632, 635, 636, 317; 445/26
See application file for complete search history.

(56) References Cited

U.S. PATENT DOCUMENTS

| | | | | |
|---|---|---|---|---|
| 3,296,482 | A | * | 1/1967 | Agdur et al. .......... 313/341 |
| 3,982,720 | A | * | 9/1976 | Inderbiethen .......... 249/81 |
| 4,877,394 | A | * | 10/1989 | McFarlane .......... 425/567 |
| 5,747,074 | A | * | 5/1998 | Ollendick et al. ........ 425/111 |
| 6,137,229 | A |   | 10/2000 | Nishiura et al. |
| 6,456,005 | B1 |   | 9/2002 | Panchula et al. |
| 6,538,377 | B1 |   | 3/2003 | Scott et al. |
| 6,563,265 | B1 |   | 5/2003 | Sivaraman et al. |
| 6,583,563 | B1 |   | 6/2003 | Venkataramani et al. |
| 7,138,083 | B2 | * | 11/2006 | Horibe .......... 264/635 |
| 2003/0116892 | A1 |   | 6/2003 | Horibe |
| 2003/0190275 | A1 |   | 10/2003 | Miyazawa et al. |
| 2004/0113557 | A1 |   | 6/2004 | Scott et al. |
| 2005/0287319 | A1 |   | 12/2005 | Miyazawa et al. |

FOREIGN PATENT DOCUMENTS

| | | |
|---|---|---|
| CN | 1460277 A | 12/2003 |
| JP | 07047518 | 2/1995 |
| WO | 02/065501 A1 | 8/2002 |
| WO | 02065501 * | 8/2002 |

* cited by examiner

*Primary Examiner*—Matthew J. Daniels
(74) *Attorney, Agent, or Firm*—Pearne & Gordon LLP

(57) ABSTRACT

A method and device for making integrally formed one-piece molded parts is provided, where the molded parts are to contain a void within their volume. An exemplary such molded part is an arc tube for a discharge lamp. A wax core is first molded onto a core pin wire in the shape of the desired void, the discharge chamber in the case of an arc tube. Then the part is molded over the wax core to provide an integrally formed one-piece part having the appropriately dimensioned void volume therein defined by the wax core. After the part has been hardened around the wax core, the core is removed by conventional means. The holes through the finished molded part left after the core pin wire is removed can be filled in, or in the case of an arc tube they are useful as passageways to accommodate electrodes therethrough.

7 Claims, 5 Drawing Sheets

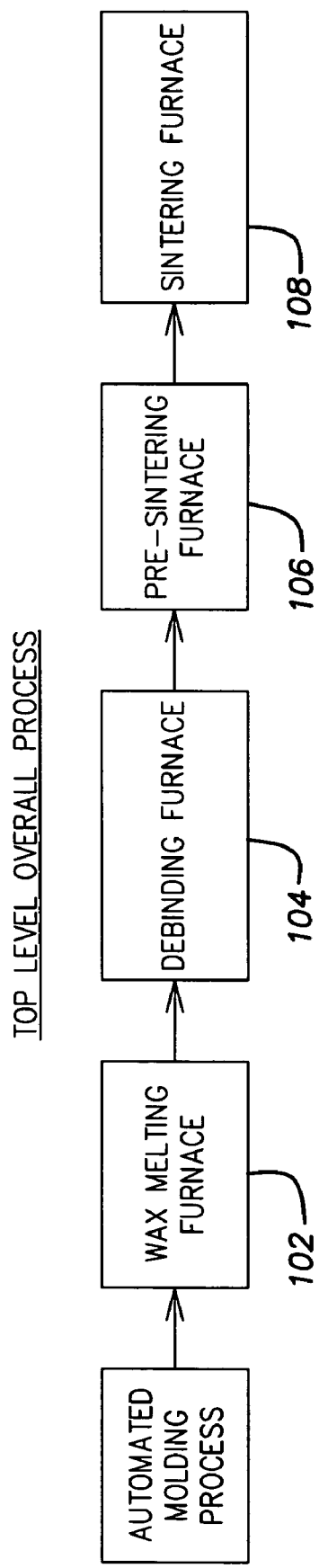

US 7,682,547 B2

INTEGRALLY FORMED MOLDED PARTS AND METHOD FOR MAKING THE SAME

FIELD OF INVENTION

The present invention relates generally to integrally formed one-piece molded parts having a void space therein. More particularly it relates to a method of producing a one-piece ceramic arc tube that is useful in, e.g., ceramic metal halide (CMH) lamps.

BACKGROUND OF THE INVENTION

Discharge lamps produce light by ionizing a filler material such as a mixture of metal halides and mercury with an electric arc passing between two electrodes. The electrodes and the filler material are sealed within a translucent or transparent discharge chamber or arc tube which contains and maintains the pressure of the energized filler material and allows the emitted light to pass through it. The filler material emits a desired spectral energy distribution in response to being excited by the electric arc. For example, halides produce spectral energy distributions that offer a broad choice of light properties, e.g. color temperatures, color renderings, and luminous efficacies.

Historically, the arc tube in a discharge lamp was formed from fused quartz, which was then shaped into desired geometric shapes. However, fused quartz had disadvantages resulting from its reactive properties at high operating temperatures. Thus ceramic arc tubes were developed to operate at higher temperatures for improved color temperatures, color renderings, and luminous efficacies, while significantly reducing reactions with the filler material.

Conventionally, ceramic arc tubes have been constructed from multiple parts that are extruded or die pressed from a ceramic powder. The multitude of parts are assembled by placing and bonding them together to form a complete arc tube. This process has numerous disadvantages. For example, a defect may be present in a single part thus rendering the entire arc tube defective. Furthermore, a leak may occur between two improperly bonded parts.

A manufacturing process is desirable to manufacture a one-part or integrally formed arc tube.

BRIEF SUMMARY OF THE INVENTION

A method of making an arc tube is provided having the following steps: a) molding a wax core onto a core pin wire; b) molding the arc tube over the wax core such that the core pin wire extends continuously through an interior volume of the arc tube; and c) removing the wax core from within the interior volume of the arc tube after the arc tube has been molded.

A further method of making an arc tube is provided having the following steps: a) providing a core pin wire having a first segment and a second segment, wherein the first segment is located at a position along the core pin wire ahead of the second segment; b) conveying the core pin wire along a conveyance path such that the first segment is conveyed to a first, wax molding station; c) at the wax molding station, molding a first wax core onto the core pin wire at the first segment thereof; d) thereafter advancing the core pin wire along the conveyance path to thereby convey the first segment to a second, arc tube molding station, and the second segment to the first, wax molding station; e) thereafter, at the wax molding station molding a second wax core onto the core pin wire at the second segment, and at the arc tube molding station molding a first arc tube over the first wax core at the first segment.

A continuous molding device also is provided for producing one-piece integrally formed arc tubes. The device has a wax molding station having opposing first and second wax mold halves which together define a wax mold when in a closed position, wherein each wax mold half has a respective wax mold cavity half provided therein such that in the closed position, the respective wax mold cavity halves define a complete wax mold cavity. The wax mold halves are further provided with respective opposed and longitudinally extending grooves such that a longitudinal pathway is defined through the wax mold along a machine direction for conveying a core pin wire through the device when the wax mold halves are in the closed position in order to accommodate a core pin wire therethrough. The device also has, at a location downstream from the wax molding station relative to the machine direction, an arc tube molding station having opposing first and second arc tube mold halves which together define an arc tube mold when in a closed position, wherein each arc tube mold half has a respective arc tube mold cavity half provided therein such that in the closed position, the respective arc tube mold cavity halves define a complete arc tube mold cavity. The arc tube mold halves are further provided with respective opposed and longitudinally extending grooves such that a longitudinal pathway is defined through the arc tube mold along the machine direction when the arc tube mold halves are in the closed position in order to accommodate a core pin wire therethrough.

A continuous molding device also is provided for producing one-piece integrally formed molded parts having at least one void space therein. The device has first and second reciprocating base members that are reversibly moveable toward and away from one another into respective closed and open positions. The base members have fixed thereto respective and opposing first and second wax mold halves having respective first and second wax mold cavity halves provided therein such that in the closed position of the base members the respective wax mold halves define a complete wax mold and the respective wax mold cavity halves define a complete wax mold cavity. The device also has, at a location downstream from the first and second wax mold halves relative to a machine direction for conveying a core pin wire through the device, respective and opposing first and second part mold halves having respective first and second part mold cavity halves provided therein such that in the closed position of the base members the respective part mold halves define a complete part mold and the respective part mold cavity-halves define a complete part mold cavity. The device also includes means to tension the core pin wire during operation of the device.

A further combination is provided including a core pin wire having a wax core molded thereon, and a molded part molded over the wax core such that the core pin wire extends continuously through an interior volume of the molded part.

A further method is provided for making integrally formed one-piece molded parts having void spaces therein in a continuous process. The method includes the following steps: at a first segment of a core pin wire, molding a first wax core onto the core pin wire and a first molded part over the first wax core, wherein first wax core has dimensions corresponding to a desired void space to be provided within the first molded part, and at a second segment of the core in wire, molding a second wax core onto the core pin wire and a second molded part over the second wax core, wherein the second wax core has dimensions corresponding to a desired void space to be provided within the second molded part, whereby the core pin wire extends through interior volumes of both the first and the second molded parts.

BRIEF DESCRIPTION OF THE DRAWINGS

FIG. 8 is a top-level block diagram illustrating an overall process for manufacturing an integrally formed or one-piece ceramic arc tube.

DETAILED DESCRIPTION OF PREFERRED EMBODIMENTS OF THE INVENTION

Figure 1:
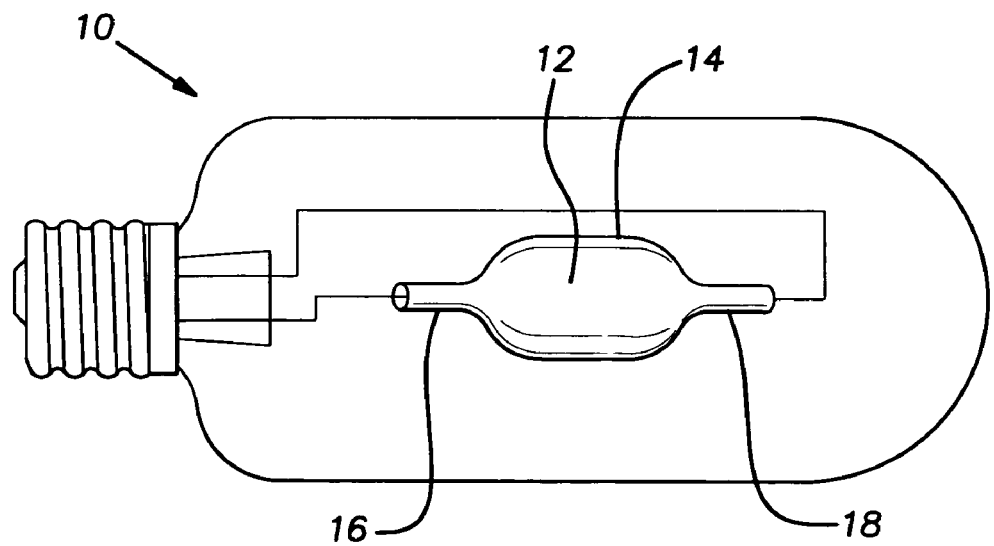
FIG. 1 shows a light source incorporating an arc tube according to the present invention.

As used herein, wherein a range such as "5-25" or "5 to 25" is given, this means preferably at least 5 and separately and independently, preferably not more than 25. Referring now to the drawings, FIG. 1 shows a discharge lamp 10 housing a ceramic arc tube 12 made using a process according to the present invention. The arc tube 12 may be a ceramic metal halide (CMH) arc tube, or it can be an arc tube for another type of discharge lamp known in the art. It also is to be noted the lamp 10 illustrated in FIG. 1 is designed to screw into a conventional screw-socket type lamp fixture as known in the art. However, an arc tube according to the invention is not limited to use screw-type lamps, and can be used, e.g., in other known or conventional types of lamp fixtures, including, without limitation, G12, Mini, TD, and PAR reflector styles. The arc tube 12 includes a discharge chamber 14 and two leg portions 16, 18. The leg portions 16, 18 extend axially away from the discharge chamber 14 from opposite sides thereof and enclose the electrodes which extend from the outside into the discharge chamber 14 to provide the necessary discharge during lamp operation.

Figure 2:
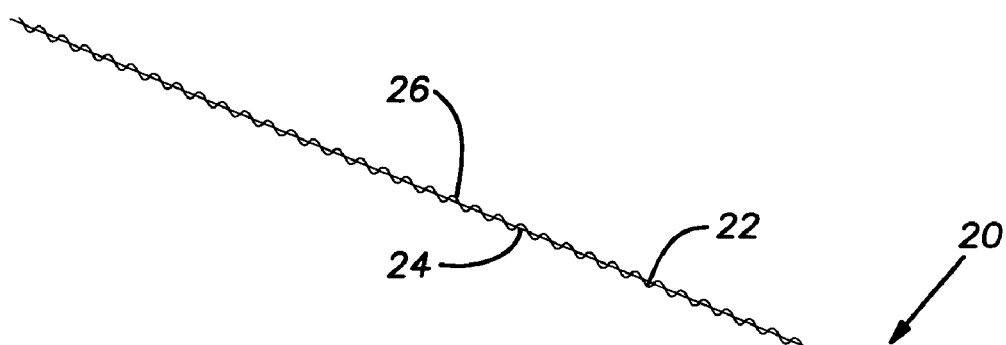
FIG. 2 is a view of a coiled-over core wire that is used as a core pin in a process according to the invention.

FIGS. 2-5 illustrate a process according to the present invention for molding a one-piece or integrally formed arc tube 12. FIG. 2 shows a support structure according to the invention referred to herein as core pin wire 20. The core pin wire 20 supports a wax core 40 and the arc tube 12 during a molding process for manufacturing the arc tube that will be described in detail further below. In one embodiment of the present invention the core pin wire 20 includes a wire that is brought under tension during the molding process. The wire may be a single straight core wire alone, or a coiled-over core wire 22 as illustrated in FIG. 2. It will be appreciated from FIG. 2 that to obtain a single straight core wire as described in the preceding sentence, one simply would use the straight wire 24 illustrated in that figure and omit the coiled wire 26. As used herein, a straight wire does not imply or require the wire be rigid or perfectly straight or linear. By "straight," it is only meant to distinguish from the coiled wire 26 that is wrapped around the straight wire 24, e.g. in a helical path. The straight wire (or core wire) may, in fact, be bent or bendable to facilitate a manufacturing process for molding one-part arc tube bodies, for example winding the core pin wire 20 up on a take-up roll following a molding operation. A single straight core wire may consist of a wire made from, but not limited to, steel such as 4140 or nickel plated steel or from stainless steel similar to SS304, SS316, SS416, SS440. Alternatively, the core pin wire 20 may be provided as a bundle of spun wires to provide a core wire having a rope-like configuration which may aid in binding the wax core 40 to the wire 20 during a manufacturing process (explained below).

It should be evident from the preceding paragraph that the core pin wire 20 as used herein is understood to embrace the embodiment where only a single straight core wire 24 is provided (with no over-wound coiled wire 26), as well as the embodiment where a coiled wire 26 is provided wrapped around the straight core wire 24 to yield a coiled-over core wire 22 as illustrated in FIG. 2. For purposes of illustration, the remainder of the description will be provided with respect to the coiled-over core wire 22, but it will be understood this is not intended to limit the scope of the invention. A single straight core wire, or alternatively a bundled spun core wire, can be used as the core pin wire 20 in the process of the invention as will become apparent.

Returning to FIG. 2, the coiled-over core wire 22 includes a straight wire 24 and a coiled wire 26 that is coiled around the straight wire 24 along its length in a substantially helical path. In other words, the coiled wire 26 is wrapped or coiled around the straight wire 24 along a path that extends lengthwise of the wire 24. The coiled wire 26 provides additional oblique surface area for the wax core 40 to be fixed or retained to the core wire 22 during a molding process as will be described in detail further below. The straight wire 24 can be or comprise wire made from, but not limited to, steel such as 4140 or nickel plated steel or from stainless steel similar to SS304, SS316, SS416, SS440, less preferably from other suitable materials. The coiled wire 26 can be or comprise a wire made from, but not limited to, steel such as 4140 or nickel plated steel, stainless steel such as SS304, SS316, or similar stainless steel, molybdenum or tungsten, less preferably from other suitable materials.

The straight wire 24 and the coiled wire 26 each can range in diameter, e.g., from 0.016 inches to 0.060 inches, depending on the diameter of the particular electrode wires for the arc tube 12 that is to be manufactured. It is desirable that the major or greatest diameter of the core pin wire 20 (such as coiled-over core wire 22 in this embodiment) is selected to correspond roughly to the diameter of the electrode wires that will be used, such that the electrode wires can be inserted snugly after sintering through the axially extending holes left behind in the leg portions 16,18 once the core pin wire 20 has been removed (described below). In one embodiment, the major diameter of the coiled-over core wire 22 is about or does not exceed 5 or 10 or 15 or 20 percent of the diameter of the leg portion 16,18 for the arc tube 12 to be formed.

Figure 3:
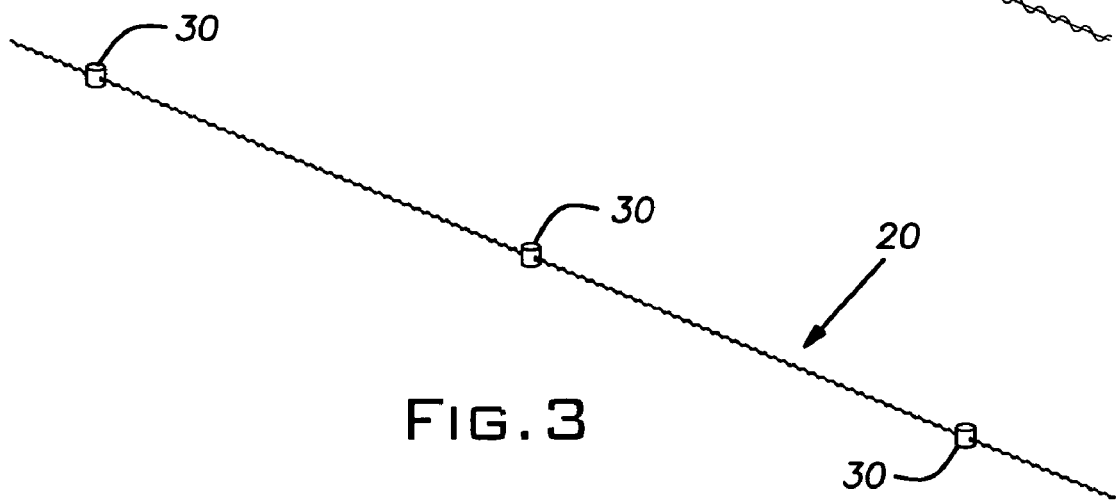
FIG. 3 is a view of the wire of FIG. 2 showing the location of the bosses.

FIG. 3 shows a plurality of bosses 30 spaced periodically along the length of the core pin wire 20 at a stage prior to the molding process. The bosses 30 are provided at spaced intervals and fixed at least to the straight wire 24, though optionally also to the coiled wire 26. The bosses 30 are spaced from one another a distance sufficient to accommodate a molded arc tube 12 therebetween, and are provided to selectively tension discrete segments of the core pin wire 20 during molding of the arc tube 12 as explained below. The bosses 30 can be attached to the core pin wire 20 by any suitable method known or convention in the art.

Figure 4:
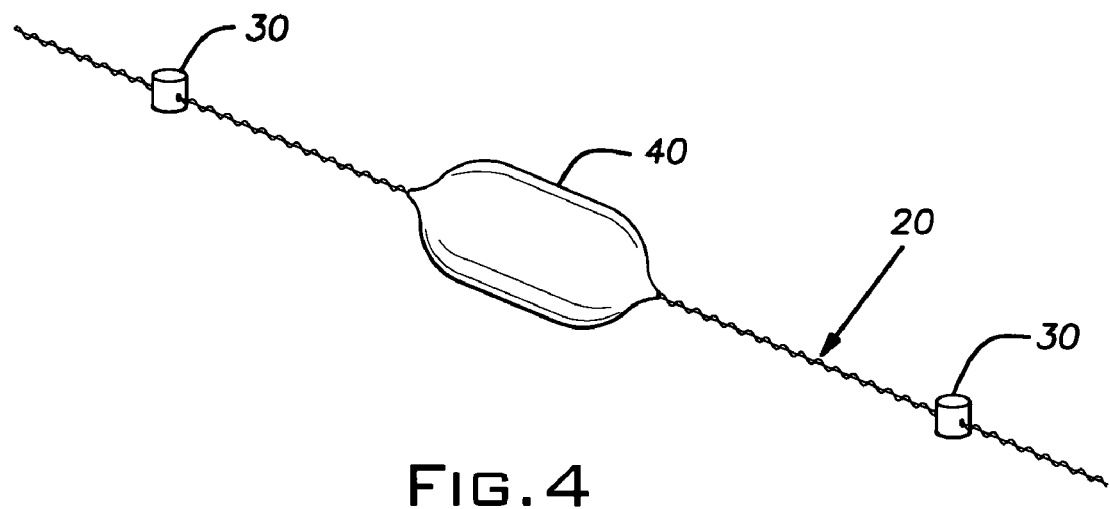
FIG. 4 is a view of the wire of FIG. 3 at an early stage of an arc tube manufacturing process, where a wax core has been molded over the wire between adjacent bosses.
Figure 5:
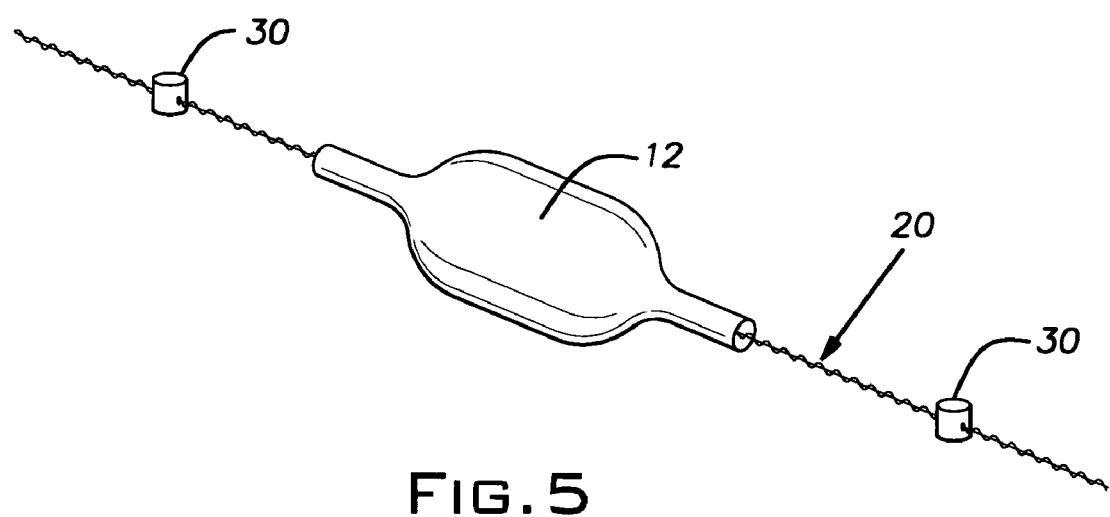
FIG. 5 is a view of the wire of FIG. 4 at a later stage of the manufacturing process, where a ceramic shell has been molded over the wax core.

FIG. 4 shows a wax core 40 molded over or onto the core pin wire 20 at a location between two adjacent bosses 30, and aligned substantially concentrically with the wire 20. This is an initial step of manufacturing an integrally formed one-piece arc tube 12 according to the invention. FIG. 5 shows a subsequent step where a ceramic arc tube 12 has been molded over the wax core 40 on the core pin wire 20. During the molding process and prior to (or during) molding the wax core 40 onto the core pin wire 20, the wire 20 is brought under tension between adjacent bosses 30 located at opposite ends of the segment where the wax core 40 is formed. Tensioning is achieved by grasping, via appropriate or suitable means (such as clamps, tensioning blocks, jaws, etc.), bosses 30 bounding the wire segment where the wax core is to be molded, and applying a force tending to separate the two bosses that is sufficient to produce the desired tension. The tension applied to the core pin wire 20 is selected to be in the range of 50-80% of its yield strength. For example, SS304 has a yield strength of 35 ksi. Thus, in this embodiment the tension applied to an SS304 core pin wire 20 is in the range of 17.5 ksi to 28 ksi. This ensures the core pin wire 20 remains in the elastic region of its stress-strain curve, below its yield threshold, permitting the core pin wire 20 to return to its original shape after tension is released. Table 1 below shows desirable ranges of wire tension (50-80% yield strength) for core pin wires made from the stated materials for three common wire diameters. It will be evident through minor calculation that the first column, for 304 SS, reports results consistent with the example described earlier in this paragraph.

within the arc tube 12 as-formed. By providing a continuous, rigidly tensioned core pin wire 20 as a substrate for (extending through), and which is tensioned along the axis of, the molded components (wax core 40 and ceramic arc tube 12), geometric imperfections or anomalies that have been characteristic of arc tubes made via conventional techniques are avoided or substantially eliminated. In particular, by the present technique it is not necessary to perfectly co-linearly align opposing support dowels (commonly supplied as carbide drill bits) spaced apart along a molding axis at opposite ends of the wax core or arc tube molds, and problems of off center or improperly aligned leg portions 16, 18 with respect to the discharge chamber 14 are minimized or avoided or eliminated according to the present invention.

Figure 6:
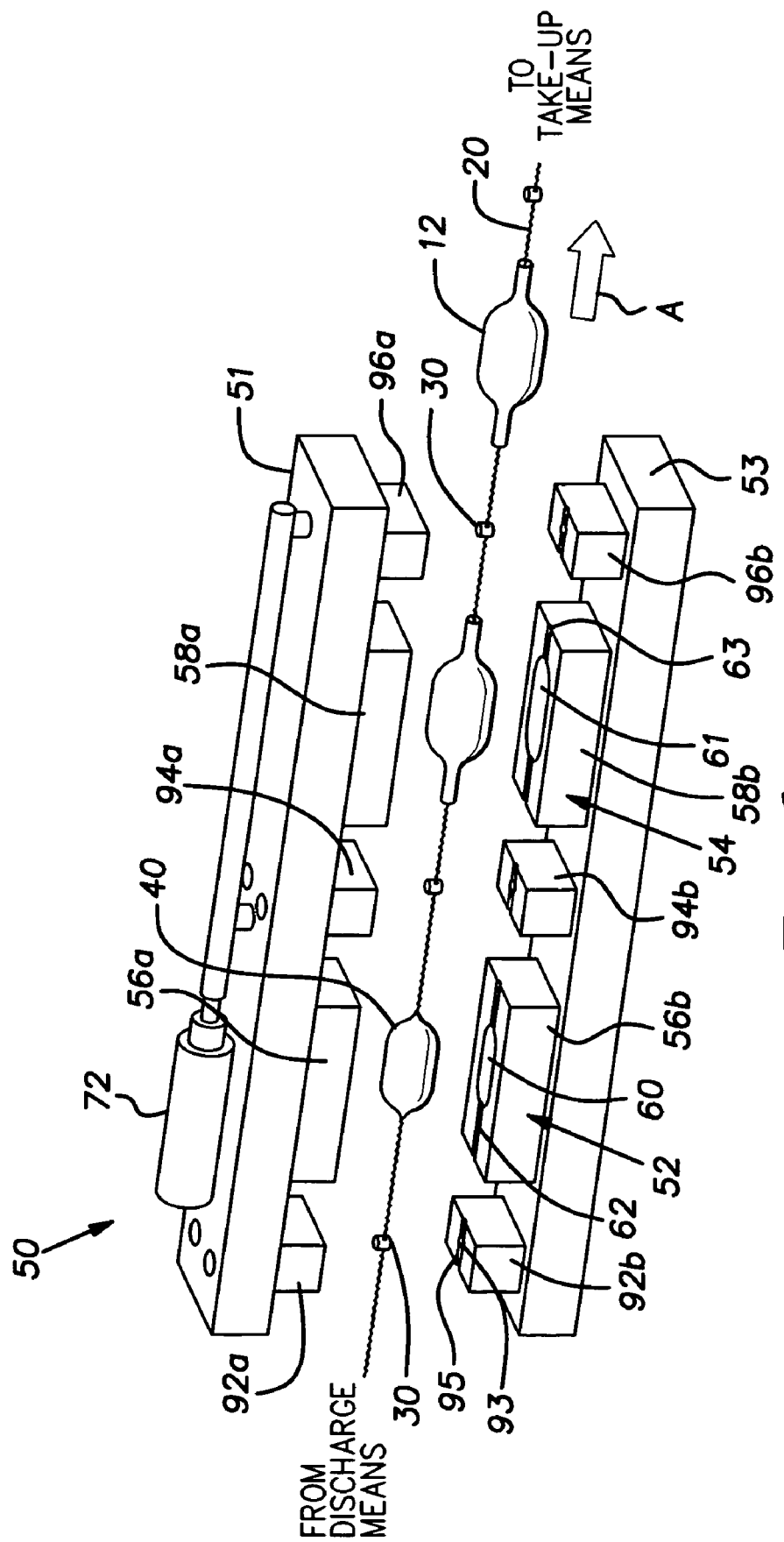
FIG. 6 is a perspective view of an automated molding device and process according to one embodiment of the invention.

Referring now to FIG. 6, a continuous process molding device 50 is shown for carrying out an automated molding process for making ceramic arc tubes 12. It should be noted that FIG. 6 shows one embodiment of a continuous molding device 50 that can be used for an automated molding process according to the invention and the following description is provided for illustrative purposes only and is not intended to limit the scope of the invention. The molding device 50 includes opposing first and second (illustrated as upper and lower) reciprocating base members 51 and 53 to which opposing mold halves and other components are fixed or attached as will be further described. By reciprocating, it is meant that the base members 51 and 53 are reversibly moveable toward and away from one another into respective closed and open positions. In the closed position opposing mold halves are brought into contact thereby defining a substantially continuous mold cavity between first and second mold

TABLE 1

| | | | Material | | | | | | | | |
|---|---|---|---|---|---|---|---|---|---|---|---|
| | | | 304 SS | | 440/416 SS (High) | | 440/416 SS (Low) | | 4140 Nickel Plated (Low) | | 4140 Nickel Plated (High) |
| | | | Yield strength (lb/in$^2$) | | | | | | | | |
| | | | 35000 lb @ % Yield Strength | | 60000 lb @ % Yield Strength | | 100000 lb @ % Yield Strength | | 90000 lb @ % Yield Strength | | 200000 lb @ % Yield Strength |
| Nominal Wire Diameter (in) | Wire Diameter (in) | Area (in$^2$) | 50% | 80% | 50% | 80% | 50% | 80% | 50% | 80% | 50% | 80% |
| 1/64 | 0.016 | 0.0002011 | 3.5 | 5.6 | 6.0 | 9.7 | 10.1 | 16.1 | 9.0 | 14.5 | 20.1 | 32.2 |
| 1/32 | 0.032 | 0.0008042 | 14.1 | 22.5 | 24.1 | 38.6 | 40.2 | 64.3 | 36.2 | 57.9 | 80.4 | 128.7 |
| 1/16 | 0.06 | 0.0028274 | 49.5 | 79.2 | 84.8 | 135.7 | 141.4 | 226.2 | 127.2 | 203.6 | 282.7 | 452.4 |

It will be evident the tension applied to the core pin wire 20 is a function of the type and diameter of the wire used as the core pin wire 20. Thus, the tension applied to the core pin wire 20 can vary in the range of, e.g., from 2 to 500 pounds depending on the selection of wire and wire diameter for a particular size of arc tube to be manufactured.

It should be noted that for the coiled-over wire 22 tension (and yield strength) are measured relative to only the straight wire 24. The coiled wire 26, being coiled around the straight wire 24, is in a more relaxed configuration relative to a tensioning force applied longitudinally of the coiled-over wire 22, and the wire 24 reaches 50-80% of its yield strength more quickly than the coiled wire 26.

The tensioned core pin wire 20 provides a rigid support first for the wax core 40 to be molded thereto. Subsequently, the ceramic arc tube 12 is molded as one piece over the wax core 40, again with the core pin wire 20 under tension, such that the wax core defines a volume for the discharge chamber 14 cavity halves provided in the respective first and second opposing mold halves. In the open position, the opposing mold halves are separated from one another thus permitting removal of a molded article, such as wax core 40 or arc tube 12, from the respectively defined mold.

It will be apparent from the present description, as illustrated in FIG. 6, that the direction of reciprocation between the base members 51 and 53 preferably is substantially perpendicular to the machine direction A (direction of travel of the core pin wire 20) in the molding device 50. It is desirable for each of the base members 51 and 53 to reciprocate to a sufficient extent such that a molded article (wax core 40 or arc tube 12) can be carried along the machine direction A by the core pin wire 20 without being obstructed by a mold half when the members 51 and 53 (and therefore opposing mold halves) are in the open position. Alternatively, it is contemplated the molding device 50 could be designed such that the base members 51 and 53 reciprocate to different degrees, or that one base member is fixed and the other reciprocates the entire distance between the open and closed positions described in this paragraph In this latter case it may be more difficult to avoid obstruction of a traveling molded article (wax core 40 or arc tube 12) by a mold half.

Referring again to FIG. 6, the first and second base members 51 and 53 have, in the machine direction, first, opposing first and second wax mold halves 56a and 56b which together define a wax mold when in the closed position (wax molding station 52), and second, opposing first and second arc tube mold halves 58a and 58b which together define an arc tube mold when in the closed position (arc tube molding station 54). Each of the first and second wax mold halves 56a and 56b has a respective wax mold cavity half provided therein such that in the closed position, the opposing wax mold halves 56a and 56b define a complete wax mold cavity 60 therebetween for molding the wax core 40. Also, each of the opposing wax mold halves 56a and 56b is provided with a pair of longitudinally opposed, coaxially aligned (relative to the mold cavity 60) and extending grooves 62 such that an axially aligned longitudinal pathway is defined through the wax mold 56 (closed mold halves 56a and 56b) along the machine direction A, in order to accommodate the core pin wire 20 therethrough during a manufacturing process.

The arc tube mold halves 58a and 58b are provided with respective mold cavity halves and grooves 63 analogously to the wax mold halves 56a and 56b, such that the arc tube mold halves 58a and 58b define an arc tube mold cavity 61 therebetween in the closed position, as well as an axially aligned longitudinal pathway through the arc tube mold 58 to accommodate the core pin wire 20 therethrough. The grooves 63 are dimensioned such that the longitudinal pathway thusly defined through the arc tube mold 58 (closed mold halves 58a and 58b) accommodates and defines the desired outer diameter of the first and second leg portions 16 and 18 of the arc tube 12 as will be understood by persons of ordinary skill in the art. Conversely, the other longitudinal pathways provided through the wax mold 56 and the tensioning blocks 92, 94 and 96 (described below) need be dimensioned sufficiently to accommodate only the core pin wire 20. The mold halves 56a,b and 58a,b are aligned such that the longitudinal pathway through the wax mold (closed mold halves 56a and 56b) is substantially coaxially aligned with that through the arc tube mold (closed mold halves 58a and 58b).

It will be understood that as used in the description of the molding device 50, the term mold half/halves denotes one or a pair of opposing mold portions or blocks that when closed or brought together form a continuous mold cavity defined by the respective recessed portions or cavities provided in each of the opposing blocks. It is not intended to imply that each mold "half" necessarily is a geometric mirror image of the other, nor that the portion of the mold cavity provided in that mold "half" necessarily is identical to or a mirror image of that provided in the other mold "half." In the illustrated embodiment, where both of the parts to be molded (wax core 40 and arc tube 12) are solids of revolution, mirror image identity of the opposing mold cavity halves (not necessarily of the mold halves themselves) is preferred. However, no such mirror image identity of either the mold halves or of the mold cavity halves provided respectively therein is considered to be required.

The molding device 50 is provided with proximate, median and distal tensioning blocks 92, 94 and 96. Relative to the machine direction A, the proximate tensioning block 92 is located upstream of the wax molding station 52, the median tensioning block 94 is located between the wax 52 and arc tube molding 54 stations, and the distal tensioning block 96 located downstream of the arc tube molding station 54. Each of these tensioning blocks is provided as a pair of opposing first and second block halves (e.g., 92a and 92b for the proximate tensioning block 92). Each block half (92a, 92b) is provided with a recess 93 such that when the halves are closed the resulting cavity, defined between opposing recesses is sized to complementarily accommodate and retain one of the bosses 30 therein. Also, each of the tensioning blocks 92, 94 and 96 is provided with longitudinally opposed and extending grooves 95 analogous to the grooves provided in the mold halves described above, which define corresponding longitudinal pathways through each of the tensioning blocks to accommodate the core pin wire 20 therethrough when the base members 51 and 53 are in the closed position. It will be appreciated that all of the longitudinal pathways provided through the tensioning blocks 92, 94 and 96 and the molds 56 and 58 are substantially coaxially aligned in order to accommodate the longitudinal extent of the core pin wire 20 therethrough along a substantially linear path during a manufacturing process.

Each of the tensioning blocks is provided and configured such that when their respective halves (92a,b, 94a,b, 96a,b) are closed together, each block is adapted to enclose and fixedly retain a boss 30 located along the core pin wire 20, with the wire being accommodated through the block via the respectively defined longitudinal pathway during a manufacturing process. In one preferred embodiment, the proximate and distal tensioning blocks 92 and 96 are moveable tensioning blocks, and are adapted to be translated or translatable along the machine direction A in order to separately provide and control the tension in a core pin wire 20 in the discrete segments spanning the respective wax and arc tube molding stations 52 and 54. In this embodiment, the median tensioning block 94 is provided as a fixed or stationary block. In this manner, when a core pin wire 20 is locked in the molding device 50 by means of three adjacent of its bosses 30 being received and retained respectively in the tensioning blocks 92, 94 and 96, translation of the proximate tensioning block 92 independently regulates the tension in the segment of the core pin wire 20 spanning the wax molding station 52, and translation of the distal tensioning block 96 independently regulates the tension in the wire segment spanning the arc tube molding station 54.

Alternatively, if it is not desired to separately regulate the tension in the discrete wire segments spanning the wax and arc tube molding stations 52 and 54, the median tensioning block 94 can be omitted, with one or both of the proximate and distal tensioning blocks being provided as a moveable tensioning block. In a further alternative, tension control can be supplied externally to the molding device 50 in which case only one or no tensioning block is required in the molding device. In this latter alternative, tensioning can be supplied external to the molding device 50 by applying an appropriate separation force to ones of the bases located respectively upstream and downstream of the device 50. Otherwise, tension can be applied by clamps or other grasping or tensioning devices acting directly on the core pin wire 20, or by tensioning rollers or reels located either or both upstream and/or downstream of the molding device 50, in which case the bosses 30 may be omitted entirely.

An automatic tensioning device 72, shown schematically in FIG. 6, can be utilized to independently regulate the tensioning force exerted on the respective segments of the core pin wire 20 by the proximate and distal tensioning blocks 92 and 96. The tensioning device 72 can include, for example, servo control of the moveable tensioning blocks, hydraulic or pneumatic control or actuation, or any combination of these in order to provide a desired or measured amount of tension in the wire segments spanning, respectively, the wax molding and arc tube molding stations 52 and 54. In the illustrated embodiment, the tensioning device 72 is shown coupled to the first or upper base member 51 to directly actuate only the first block halves 92a and 96a. In this embodiment, the second block halves 92b and 96b generally are passive and can be translated, e.g., along a track in the second base member 53, based on actuation from the associated first block half.

The second block halves 92b and 96b can be provided with means to interlock the associated first block halves in the closed position so that actuation of the first block half 92a or 96a will result in the actuation of the entire tensioning block 92 or 96. Such interlocking means can be or include, for example, a tab and slot type connection where tabs or pins extending from the facing surface of one block half (e.g. 92b or 96b in the figure) are inserted and accommodated within complementary slots or recesses in the opposing block half (92a, 96a) in the closed position. Alternatively, one or both of the opposing blocks can be provided with a series of flanges extending from the surfaces normal to the machine direction A in order to constrain opposing blocks from translating relative to one another in the machine direction when the halves are closed to form the respective tensioning block. Also it is to be noted the boss 30 itself can serve as interlocking means between opposing block halves because the boss 30 extends and is partially received within respective recesses provided in each block half. Therefore, the boss 30 acts as a pin between these opposing recesses which constrains the two halves from translating relative to one another.

Still referring to FIG. 6, a molding process according to the invention will now be described. The bosses 30 are attached to the core pin wire 20 at intervals corresponding to the distance between the recesses in adjacent ones of the tensioning blocks 92, 94 and 96. A leading portion of the core pin wire 20 is positioned in a wire path of the molding device 50 with the first and second base members 51 and 53 in the open position, such that the bosses 30 are aligned with the recesses of the tensioning blocks. Next, the base members 51 and 53 are closed, thereby closing the wax and arc tube molds 56 and 58, and also closing the tensioning blocks 92, 94 and 96 thus enclosing and retaining the correspondingly aligned bosses 30 therein. The core pin wire 20 is accommodated through all the tensioning blocks and the molds via the longitudinal pathways described above. Each of the movable tensioning blocks 92 and 96 is moved or biased in a direction away from the fixed tensioning block 94 such that a desired tension on the core pin wire 20 is independently provided in the discrete segments spanning the wax and the arc tube molding stations 52 and 54. It should be noted that the tension applied to the core pin wire 20 segment at the wax core molding station 52 may be the same tension or a different tension than the tension applied to the segment at the arc tube molding station 54. Once the proper tension is applied to the core pin wire 20 wax is injected into the cavity 60 of the wax mold 56 and cooled to a temperature such that a wax core 40 is formed about the core pin wire 20.

Once the wax core 40 is sufficiently cooled the tension applied to the core pin wire 20 is released and the upper and lower mold halves are separated. (At start-up, when the first wax core 40 on the core pin wire 20 is being formed, no arc tube 12 is molded at the arc tube molding station 54, and tensioning of the wire 20 at that station is not required). The core pin wire 20 is then advanced along a conveyance path for the core pin wire in the machine direction A until the wax core 40 is aligned in the next molding station or in this embodiment the arc tube molding station 54. Again the first and second base members 51 and 53 are closed causing the bosses 30 (now advanced to the subsequent tensioning block) to be retained in the tensioning blocks 92, 94 and 96 and the core pin wire 20 to be received in the longitudinal pathways through blocks 92, 94 and 96 and molds 56 and 58. In addition, the wax core 40 previously molded in the wax mold 56 now is received within the cavity 61 of the arc tube mold 58. The moveable bosses 30 are actuated to apply the desired tension in the wax and arc tube molding stations 52 and 54, and the process continues as follows.

The cavity 61 of the arc tube mold 58 is dimensioned larger than the cavity 60 of the wax mold 56 to a degree corresponding to the desired dimensions for the arc tube 12. Thus when the cavity 61 of the arc tube mold 58 receives the wax core 40, a substantially uniform annular void exists between the outer surface of the wax core 40 and the inner surface of the mold cavity 61. This void defines a molding space for the ceramic arc tube to be formed as an integrally formed body via injection molding, where the wax core 40 is dimensioned to correspond to the desired internal dimensions of the discharge chamber 14 of the arc tube 12 immediately after the arc tube is formed. It is to be noted the dimensions of the arc tube 12, including the chamber 14, as-molded may be larger or different than a final or finished arc tube that will go into a production lamp in order to account for shrinkage or other dimensional changes associated with post-mold processing of the arc tube outside the scope of the present invention.

As ceramic material is injected into the cavity 61 of the arc tube mold 58, the ceramic material fills the annular void thus forming a ceramic shell around the wax core 40 thereby forming an arc tube 12 as shown in FIG. 6. At the same time, a subsequent wax core 40 is molded at the wax core molding station 52 as described above. Thus, during a continuous molding process a wax core 40 and an arc tube 12 can be simultaneously formed. Once the ceramic material of the newly molded arc tube 12 at the arc tube molding station 54 has hardened to sufficient green strength, and the wax core 40 at the wax core molding station 52 has sufficiently cooled, the tension applied to the core pin wire 20 in the respective segments is released. The upper and lower base members 51 and 53 are separated thus separating the upper and lower halves of the wax and ceramic-core molds 56a,b and 58a,b (as well as the tensioning block halves), and the core pin wire 20 is advanced one increment in the machine direction A such that the just-formed wax core 40 is advanced to the arc tube molding station 54 and the newly molded arc tube 12 is advanced out of the molding device 50, and the process repeats. FIG. 6 shows the automated process in a state where at least three wax cores 40 and at least two arc tubes 12 have been molded but prior to advancement of the core pin wire 20.

To further facilitate a continuous, automated process, a discharge means for delivering or supplying the core pin wire 20 to the molding device 50, and a take-up or collecting means for collecting the core pin wire 20 having a plurality of arc tubes 12 molded along its length on exit from the molding device 50, can be provided. The discharge means and take-up means can be any type known in the art such as reels, rollers, conveyers, etc. and will not be described in further detail except to note that optionally the discharge and/or take-up means can be designed to provided to supply wire tension if tension is to be supplied external to the molding device 50. After a sufficient number of arc tubes 12 are formed and collected on the take-up means, the core pin wire 20 can be cut and the arc tubes 12 prepared for further processing.

Figure 7:
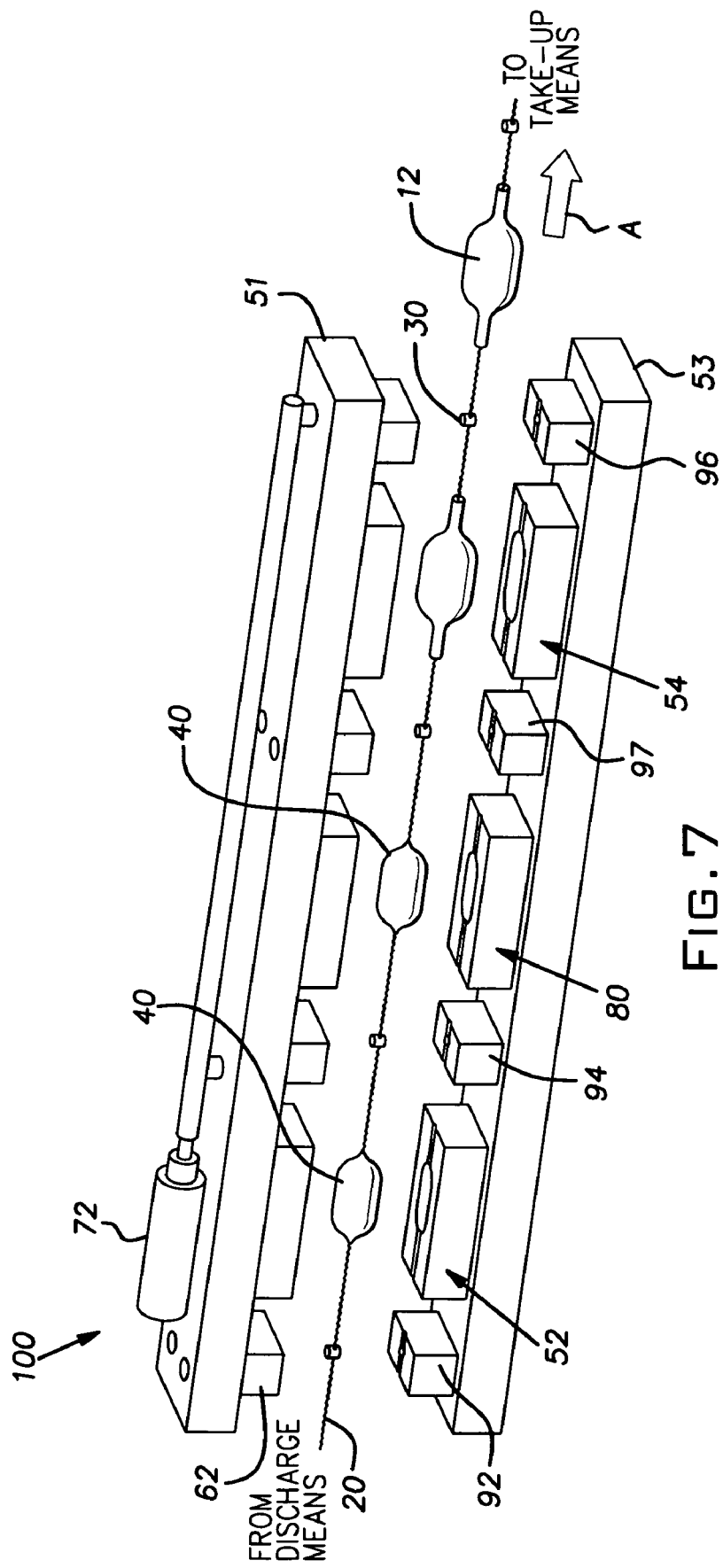
FIG. 7 is a perspective view of an automated molding device and process according to a further embodiment of the invention.

Referring now to FIG. 7, FIG. 7 shows a further embodiment of a continuous molding device 100 for carrying out an automated molding process for making ceramic arc tubes 12.

It should be noted the following description in reference to FIG. 7 is provided for illustrative purposes only and is not intended to limit the scope of the invention. The continuous molding device 100 operates in a similar manner as the continuous molding device 50 shown in FIG. 6 and described above. Thus, all the components of the continuous molding device 100 in FIG. 7 that are common to the components of the continuous molding device 50 in FIG. 6 have the same function and reference numbers and will not be re-described. The main difference between the molding devices 50 and 100 is that the molding device 100 includes a third station or more specifically an inspection-cooling-holding station 80 disposed intermediate the wax and arc tube molding stations 52 and 54. The station 80 can serve a number of functions. For example, the station 80 can include an inspection means. The inspection means inspects the wax core 40 to ensure that the wax core 40 is concentrically aligned about the core pin wire 20, and further detects geometric anomalies. If the inspection means detects a geometric anomaly that would result in a defective arc tube 12 the inspection means transmits a signal to a controller to abort the injection of ceramic material at the arc tube molding station 54 when the defective wax core 40 reaches the arc tube molding station 54. If the inspection means does not detect any geometric anomalies the inspection means transmits a signal to the controller to permit the injection of the ceramic material when the wax core 40 reaches the arc tube molding station 54.

The station 80 also can include or incorporate a cooling mechanism, such as fin-type convective heat exchange, coolant flow heat exchange, radiative or conductive heat-sink, etc., to cool the wax core 40 to a suitable temperature to prevent the wax core 40 from melting prior to injection of the ceramic material in the arc tube mold 58. The station 80 also holds or encloses the just-made wax core 40 while a new wax core and arc tube 12 are being molded at their respective molding stations to prevent damage to the wax core 40 prior to delivery into the arc tube mold 58 and injection of the ceramic material.

Still referring to FIG. 7, this embodiment includes an additional tensioning block 97. Tensioning of the core pin wire 20 in this embodiment can be performed in multiple ways. For example, tensioning of the core pin wire 20 can be tensioned in the same manner as described above. Thus, tensioning blocks 94 and 97 would be fixed and tensioning blocks 92 and 96 would be movable. Therefore, tensioning blocks 92 and 96 are moved or biased in a direction away from the fixed tensioning blocks 94 and 97 respectively such that a desired tension on the core pin wire 20 is independently provided in the discrete segments spanning the wax and the arc tube molding stations 52 and 54. Furthermore, because there is a fixed tensioning block on either side of the inspection-cooling-holding station 80 no tension is applied to the core pin wire 20 at the station 80. In another example, tensioning blocks 92 and 97 can be fixed and tensioning blocks 94 and 96 can be movable. Thus, tensioning blocks 94 and 96 are moved or biased in a direction away from tensioning blocks 92 and 97 respectively, or in other words in the same direction of the arrow A, such that a desired tension on the core pin wire 20 is independently provided in the discrete segments spanning the wax and the arc tube molding stations 52 and 54. In yet another example, tensioning blocks 94 and 96 can be fixed and tensioning blocks 92 and 97 can be movable. Thus, tensioning blocks 92 and 97 are moved or biased in a direction away from tensioning blocks 94 and 96 respectively, or in other words opposite to that of arrow A, such that a desired tension on the core pin wire 20 is independently provided in the discrete segments spanning the wax and the arc tube molding stations 52 and 54.

In this embodiment, a wax core 40 and an arc tube 12 are formed while an intermediately formed wax core 40 is inspected and cooled. FIG. 7 shows an automated process in a state where at least four wax cores 40 and at least three arc tubes 12 have been molded but prior to advancement of the core pin wire 20.

FIG. 8 shows a block diagram of an overall process for making an integrally formed one-piece ceramic arc tube, beginning with a molding stage which is the subject of the present invention, and continuing through a number of other conventional stages. Various other or alternative post-mold processes or operations may be performed by the person of ordinary skill in the art, including fewer or greater than are depicted in FIG. 8, to impart desired properties or configurations to an integrally formed one-piece ceramic arc tube 12 that has been molded as described herein, and these do not affect the scope of the present invention. FIG. 8 and the description of it that follows are provided merely to show the present invention in the context of an overall process of which it may form a part.

The heating stages shown in FIG. 8 are or can be those conventionally known in the art and will not be described in detail. Once an arc tube 12 has been made by a molding process according to the invention, the wax core 40 is removed from inside the arc tube 12 by placing the arc tube 12 in a furnace 102 and heating to a sufficient temperature to melt the wax core 40. The wax melting process also can be accomplished by applying an electric current to the core pin wire 20 thereby heating the core pin wire 20 to a predetermined temperature thus melting the wax core 40. Once the wax core 40 has melted and all the wax has been removed from inside the arc tube 12, the arc tube 12 can be removed from the core pin wire 20 by sliding the wire out. The arc tube 12 then can be subjected to further processing outside the scope of the present invention, such as heating in a debinding furnace 104 to remove impurities followed by other sintering steps (e.g. heating in presintering and sintering furnaces 106 and 108 in FIG. 8) to strengthen the arc tube 12.

In addition to providing arc tubes 12 having uniform and integral structure such that the leg portions 16 and 18 are substantially coaxially aligned, a further advantage of the present invention is that because it produces a plurality of arc tubes 12 formed over wax cores at spaced intervals along a single core pin wire 20, subsequent processing steps can be designed to perform de-waxing, sintering and other steps in a continuous mode at steady state. For example, the various furnaces described above can be provided at fixed stations and the core pin wire 20 can be conveyed through these at a rate that is determined by the rate of periodic advancement of the wire 20 through the automatic molding device 50,100 where the wax cores 40 and the integrally formed arc tubes 12 are molded. A removal station for removing the individual arc tubes 12 from the core pin wire 20 can be provided downstream of the other manufacturing stations.

The above description has been provided with respect to the manufacture of an integrally formed ceramic arc tube 12. However, it will be understood and appreciated by persons of ordinary skill in the art that the disclosed method can be adapted and applied, without undue experimentation, to the manufacture of other molded articles that are to be integrally formed as one piece and which are hollow or substantially hollow, or otherwise which include hollowed out portions. For example, a molded part that is to contain a hollowed out or void space within its volume can be provided substantially as described hereinabove, where a wax core is first molded onto a core pin wire or other carrier substrate that corresponds in dimension (size and shape) to the particular void to be provided. Then, again in like fashion as above described, the thusly molded wax core is transferred, e.g., by conveyance along the wire (or other substrate path) to a mold for the part to be formed, and the wax core is suspended at the appropriate location within that mold while the appropriate molding material is injected into the space defined between the mold wall and the wax core. Once the injected material has hardened, the entire assembly (molded part and enveloped wax core) is removed from the mold and the wax core is melted and removed. If the finished molded article is not to have any holes or pathway therethrough, such as left behind after removal of a core pin wire 20, a small quantity of the molding compound or other suitable material can be used to seal off the openings that are left behind. Otherwise, it is contemplated for many molded parts that while such openings may not be intended or will serve no substantial purpose in the finished part, nevertheless their presence as an artifact of the process by which they were molded will have no significant impact on the use or integrity of the finished part. Finally, it is to be noted that the process according to the invention for molding other void-containing parts is not to be limited exclusively to ceramic parts; it is contemplated other non-ceramic molding materials or compounds can be used to provide molded parts from other desirable materials, so long as such other materials are compatible with the techniques used to remove the wax core once the molded part has been formed.

In the case of the ceramic arc tube 12 described above, it is noted that any suitable ceramic material can be used, such as silica, alumina, zirconia, or other ceramics, as well as combinations of suitable ceramic materials. It is further noted that the size of the ceramic arc tube to be manufactured will depend on the wattage of the lamp in which it will be employed; higher wattage applications require larger arc tubes 12, which in turn may make it desirable to use a larger diameter core pin wire 20 to support the arc tubes during manufacturing, as well as to provide suitably dimensioned conduits both to remove the wax core material and to accommodate the electrodes that subsequently will be inserted through the leg portions 16 and 18 of the arc tube to sustain a discharge therein.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of making an arc tube comprising:
   a) providing a metal core pin wire having a first segment and a second segment, said first segment being located at a position along said core pin wire ahead of said second segment, said core pin wire having a plurality of bosses provided at spaced intervals along the length thereof, each of said first and second segments being defined respectively between adjacent ones of said bosses wherein said core pin wire extends beyond said bosses at each of said first and said second segment ends;
   b) conveying said core pin wire along a conveyance path such that said first segment is conveyed to a first, wax molding station;
   c) selectively tensioning said first segment of said core pin wire during molding of said first wax core at said wax molding station by applying a force to one or both of the adjacent bosses defining the first segment sufficient to produce a predetermined tension therein;
   d) at said wax molding station, molding a first wax core onto said core pin wire at said first segment thereof;
   e) thereafter advancing said core pin wire along said conveyance path to thereby convey said first segment to a second, arc tube molding station, and said second segment to said first, wax molding station;
   f) thereafter, at said wax molding station molding a second wax core onto said core pin wire at said second segment, and at said arc tube molding station molding a first arc tube over said first wax core at said first segment.

2. A method according to claim 1, further comprising, after step f), advancing said core pin wire along said conveyance path to thereby convey said first segment out of said arc tube molding station, and said second segment into said arc tube molding station, and molding a second arc tube over said second wax core at said second segment of said core pin wire.

3. A method according to claim 2, wherein a third wax core is molded onto a third segment of said core pin wire while said second segment thereof is located at said arc tube molding station.

4. A method according to claim 1, further comprising tensioning said first segment of said core pin wire during molding of said first arc tube over said first wax core at said arc tube molding station by applying a force to one or both of the adjacent bosses defining the first segment sufficient to produce a predetermined tension therein.

5. A method according to claim 1, performed as a continuous process at steady state to continuously mold successive ones of said arc tubes at successive longitudinally spaced segments along said core pin wire.

6. A method of making an arc tube, comprising the steps of:
   a) providing a metal core pin wire, said core pin wire comprising a plurality of bosses spaced along said core pin wire, said bosses defining a first segment and a second segment positioned along said core pin wire such that said first segment and said second segment have bosses at both respective segment ends and said core pin wire extends beyond said bosses at both said ends, said first segment being located ahead of said second segment;
   b) positioning said first segment and said second segment of said core pin wire between two tension blocks such that said first segment is in an inspection station and said second segment is in a wax molding station, wherein said first segment of said core pin wire has a first wax core molded thereon;
   c) adjusting at least one of said tension blocks to selectively tension said first segment and said second segment of said core pin wire;
   d) at said second segment of said core pin wire, molding a second wax core onto said core pin wire
   e) releasing said tension from said first segment and said second segment of said core pin wire;
   f) positioning said first segment of said core pin wire having said first wax core molded thereon in an arc tube molding station and molding a first arc tube over said first wax core;
   g) removing said first wax core from said core pin wire from within the interior volume of said first arc tube.

7. A method of making integrally formed one-piece molded parts having void spaces therein in a continuous process, the method comprising:

at a first segment of a metal core pin wire, said first segment defined by two bosses and said core pin wire extends beyond said bosses, selectively tensioning said first segment of said core pin wire during molding of said first wax core at said wax molding station by applying a force to one or both of the adjacent bosses defining said first segment sufficient to produce a predetermined tension therein, molding a first wax core onto said core pin wire and a first molded part over said first wax core, said first wax core having dimensions corresponding to a desired void space to be provided within said first molded part, and at a second segment of said core pin wire, said second segment defined by two bosses and said core pin wire extends beyond said bosses, selectively tensioning said second segment of said core pin wire during molding of said second wax core at said wax molding station by applying a force to one or both of the adjacent bosses defining said second segment sufficient to produce a predetermined tension therein, molding a second wax core onto said core pin wire and a second molded part over said second wax core, said second wax core having dimensions corresponding to a desired void space to be provided within said second molded part, whereby said core pin wire extends through interior volumes of both said first and said second molded parts.

* * * * *